United States Patent
Li et al.

(10) Patent No.: US 12,394,227 B2
(45) Date of Patent: Aug. 19, 2025

(54) SYSTEMS, METHODS, AND MEDIA FOR SEMANTIC SEGMENTATION OF A POINT CLOUD FRAME

(71) Applicants: Xinhai Li, Markham (CA); Yuan Ren, Thornhill (CA); Ran Cheng, Shanghai (CN); Bingbing Liu, Beijing (CN)

(72) Inventors: Xinhai Li, Markham (CA); Yuan Ren, Thornhill (CA); Ran Cheng, Shanghai (CN); Bingbing Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 350 days.

(21) Appl. No.: 17/944,936

(22) Filed: Sep. 14, 2022

(65) Prior Publication Data

US 2023/0080574 A1    Mar. 16, 2023

Related U.S. Application Data

(60) Provisional application No. 63/244,216, filed on Sep. 14, 2021.

(51) Int. Cl.
*G06V 20/70* (2022.01)
*G06T 7/11* (2017.01)
*G06V 10/77* (2022.01)
*G06V 10/774* (2022.01)

(52) U.S. Cl.
CPC ............... *G06V 20/70* (2022.01); *G06T 7/11* (2017.01); *G06V 10/7715* (2022.01); *G06V 10/774* (2022.01); *G06T 2207/10016* (2013.01); *G06T 2207/20081* (2013.01)

(58) Field of Classification Search
CPC .. G06V 20/70; G06V 10/7715; G06V 10/774; G06T 7/11; G06T 2207/10016; G06T 2207/20081
See application file for complete search history.

(56) References Cited

U.S. PATENT DOCUMENTS

| 10,936,908 B1 * | 3/2021 | Ho ........................ G06V 10/26 |
| 11,763,478 B1 * | 9/2023 | Yang ........................ G06T 7/62 |
| 2006/0104535 A1 * | 5/2006 | Varekamp ................ G06T 7/12 |
| | | 382/275 |
| 2019/0065867 A1 * | 2/2019 | Huang ................... G06V 20/56 |

(Continued)

OTHER PUBLICATIONS

Zhou, H. et al. "Cylinder3D: An Effective 3D Framework for Driving-scene LiDAR Semantic Segmentation", arXiv:2008.01550 2020.

(Continued)

*Primary Examiner* — John B Strege (57) ABSTRACT

A computer-implemented method, a computing system, and a non-transitory machine-readable medium for semantic segmentation of a point cloud frame are provided. Point cloud frames including a target point cloud frame are received. For each sequence of a sliding set of sequences of point cloud frames, the sequence including the target point cloud frame, each point cloud frame in the sequence of point cloud frames is semantically segmented to apply semantic labels to points. A most prevalent semantic label is determined for each point in the target point cloud frame across the sliding set of sequences of point cloud frames.

20 Claims, 7 Drawing Sheets

(56) References Cited

U.S. PATENT DOCUMENTS

2023/0072731 A1\* 3/2023 Li .................... G01S 7/4808
2023/0169632 A1\* 6/2023 Kulkarni ............ G06T 11/00
                                                    382/276

OTHER PUBLICATIONS

Shi, H. et al. "SpSequenceNet: Semantic Segmentation Network on 4D Point Clouds," 2020 IEEE/CVF Conference on Computer Vision and Pattern Recognition (CVPR), doi: 10.1109/CVPR42600. 2020.00463. 2020.

Choy, C., et al. "4D Spatio-Temporal ConvNets: Minkowski Convolutional Neural Networks." 2019 IEEE/CVF Conference on Computer Vision and Pattern Recognition (CVPR) 2019.

\* cited by examiner

SYSTEMS, METHODS, AND MEDIA FOR SEMANTIC SEGMENTATION OF A POINT CLOUD FRAME

CROSS-REFERENCE TO RELATED APPLICATIONS

This application claims the benefit of U.S. Provisional Application No. 63/244,216 filed on Sep. 14, 2021, the entire contents of which are incorporated herein by reference.

TECHNICAL FIELD

The present application generally relates to point clouds, and in particular to methods, systems, and media for semantic segmentation of a point cloud frame.

BACKGROUND

Scene understanding, otherwise referred to as perception, is one of the primary tasks for autonomous driving, robotics, and surveillance systems. Light Detection and Ranging (LIDAR) sensors are generally used for capturing a scene (i.e. an environment) of a vehicle, robot, or surveillance system. A LIDAR sensor is an effective sensor for capturing a scene because of its active sensing nature and its high resolution sensor readings.

A LIDAR sensor generates point clouds where each point cloud represents a three-dimensional (3D) environment (also called a "scene") scanned by the LIDAR sensor. A single scanning pass performed by the LIDAR sensor generates a "frame" of point cloud (referred to hereinafter as a "point cloud frame"), consisting of a set of points from which light is reflected from one or more points in space, within a time period representing the time it takes the LIDAR sensor to perform one scanning pass. Some LIDAR sensors, such as spinning scanning LIDAR sensors, includes a laser array that emits light in an arc and the LIDAR sensor rotates around a single location to generate a point cloud frame; others LIDAR sensors, such as solid-state LIDAR sensors, include a laser array that emits light from one or more locations and integrate reflected light detected from each location together to form a point cloud frame. Each laser in the laser array is used to generate multiple points per scanning pass, and each point in a point cloud frame corresponds to an object reflecting light emitted by a laser at a point in space in the environment. Each point is typically stored as a set of spatial coordinates (X, Y, Z) as well as other data indicating values such as intensity (i.e. the degree of reflectivity of the object reflecting the laser). The other data may be represented as an array of values in some implementations. In a scanning spinning LIDAR sensor, the Z axis of the point cloud frame is typically defined by the axis of rotation of the LIDAR sensor, roughly orthogonal to an azimuth direction of each laser in most cases (although some LIDAR sensor may angle some of the lasers slightly up or down relative to the plane orthogonal to the axis of rotation).

Point cloud frames may also be generated by other scanning technologies, such as high-definition radar or depth cameras, and theoretically any technology using scanning beams of energy, such as electromagnetic or sonic energy, could be used to generate point cloud frames. Whereas examples will be described herein with reference to LIDAR sensors, it will be appreciated that other sensor technologies which generate point cloud frames could be used in some embodiments.

A LIDAR sensor can be one of the primary sensors used in autonomous vehicles or robots to sense an environment (i.e. scene) surrounding the autonomous vehicle. An autonomous vehicle generally includes an automated driving system (ADS) or advanced driver-assistance system (ADAS). The ADS or the ADAS includes a perception system that processes point clouds to generate predictions which are usable by other sub systems of the ADS or ADAS for localization of the autonomous vehicle, path planning for the autonomous vehicle, motion planning for the autonomous vehicle, or trajectory generation for the autonomous vehicle.

Semantic segmentation of point clouds, such as point clouds generated by LiDAR sensors, is a task for scene understanding. Sematic segmentation of point clouds involves partitioning a point cloud frame into multiple segments and assigning a semantic label to each point in each segment of the point cloud frame, where the semantic label is usually a number. The value of a semantic label indicates which object category (or class) a point belongs to. In autonomous driving, the semantic label assigned to each point indicates that the point belongs to a road, a sidewalk, vegetation, a trunk, a pole, a person, a car, a truck, a bicyclist, etc.

Point cloud frames may be generated by LiDAR sensors as the LiDAR sensor scans an environment of the LiDAR sensor. The point cloud frames corresponding to a scan of an environment usually contain rich spatial-temporal information that can benefit the segmentation task and may even provide extra information, such as the motion status of objects detected in the point cloud frames. Research in the area of semantic segmentation of point clouds has made considerable progress; however, most known systems and methods for semantic segmentation of point clouds usually only process one point cloud frame at a time rather than a sequence of point cloud frames.

Recently, systems for performing both semantic segmentation and motion segmentation on a sequence of point cloud frames at the same time have been developed. These systems receive a sequence of point cloud frames generated by, for example, a LiDAR sensor, as input and process the sequence of point cloud frames to encode/extract spatial-temporal features from the sequence of point cloud frames. One system for processing a sequence of point cloud frames to encode/extract spatial-temporal features from the sequence of point cloud frames is described in Hui Zhou, Xinge Zhu, Xiao Song, Yuexin Ma, Zhe Wang, Hongsheng Li, Dahua Lin: "Cylinder3D: An Effective 3D Framework for Driving-scene LiDAR Semantic Segmentation", 2020; arXiv: 2008.01550 and is known as Cyiliner3D. Cylinder3D projects all the point cloud frames in a sequence of point cloud frames to the same coordinate frame, combines the projected point cloud frames into one point cloud frame, and voxelizes the combined point cloud frame to generate a voxel 3D tensor. Cylinder3D then processes the voxel 3D tensor using a 3D convolutional neural network which performs semantic segmentation on the 3D tensor to predict semantic labels for points that are indicative of both static and dynamic objects in the sequence of point clouds. A drawback of Cylinder 3D is that when voxelizing the sequence of point cloud frames into a voxel 3D tensor, a significant amount of temporal information in the sequence of point cloud frames is lost.

Another system for processing a sequence of point cloud frames to encode/extract spatial-temporal features from the sequence of point cloud frames is described in H. Shi, G. Lin, H. Wang, T.-Y. Hung and Z. Wang, "SpSequenceNet: Semantic Segmentation Network on 4D Point Clouds," 2020 IEEE/CVF Conference on Computer Vision and Pattern Recognition (CVPR), 2020, pp. 4573-4582, doi: 10.1109/CVPR42600.2020.00463 and referred to as SpSequenceNet. SpSequenceNet includes two branches and each branch includes an encoder. The encoders of two branches are connected at different levels. Two consecutive voxelized point cloud frames of the sequence of point cloud frames are input to each encoder, each of which process to the voxelized point cloud frames to encode features therein. SpSequenceNet also includes a Cross Frame Interpolation module which is configured to encode local temporal features in the two consecutive vowelized point cloud frames. While SpSequenceNet preserves spatial-temporal information in the two consecutive voxelized point cloud frames, the system is not capable of processing more than two consecutive voxelized point cloud frames. Processing additional voxelized point cloud frames requires adding branches of encoders to the system, which reduces the computational efficient of the system.

A still another system for processing a sequence of point cloud frames to encode/extract spatial-temporal features from the sequence of point cloud frames is described in Choy, C., JunYoung Gwak and S. Savarese. "4D Spatio-Temporal ConvNets: Minkowski Convolutional Neural Networks." 2019 IEEE/CVF Conference on Computer Vision and Pattern Recognition (CVPR) (2019): 3070-3079. This system projects multiple point cloud frames in a sequence of point cloud frames into a current frame reference, and voxelize each projected point cloud frame separately to generate a 4D Tensor. The 4D tensor is then input to a 4D Spatial-Temporal ConvNet which extracts spatial-temporal features from the 4D tensor. This system preservers all spatial-temporal information in the multiple point cloud frames, however, this system requires a large amount of data than the other known systems.

Accordingly, there is a need for improved systems and methods for semantic segmentation of sequences of point cloud frames which addresses the drawbacks of prior art systems.

SUMMARY

The present disclosure describes systems and methods which provide one or more efficient techniques to perform In accordance with a first aspect of the present disclosure, there is provided a computer-implemented method for semantic segmentation of a point cloud frame, comprising: receiving point cloud frames including a target point cloud frame; for each sequence of a sliding set of sequences of point cloud frames, the sequence including the target point cloud frame, semantically segmenting each point cloud frame in the sequence of point cloud frames to apply semantic labels to points; and determining a most prevalent semantic label for each point in the target point cloud frame across the sliding set of sequences of point cloud frames.

In some or all examples of the first aspect, the computer-implemented method can further comprise: identifying a rare semantic label for at least one of the points in the target point cloud frame across the sliding set of sequences of point cloud frames; and using the rare semantic label in place of the most prevalent semantic label for the at least one point in the target point cloud frame.

In some or all examples of the first aspect, the computer-implemented method of claim 1 can further comprise: performing a single-scan semantic segmentation of the target point cloud frame; and using ensemble learning to combine the single-scan semantic segmentation with the most prevalent labels for each point in the target point cloud frame across the sliding set of sequences of point cloud frames.

In some or all examples of the first aspect, the computer-implemented method of claim 2 can further comprise: performing a single-scan semantic segmentation of the target point cloud frame; and using ensemble learning to combine the single-scan semantic segmentation with the rare semantic labels and the most prevalent labels for each point in the target point cloud frame across the sliding set of sequences of point cloud frames.

In some or all examples of the first aspect, the semantically segmenting can include: voxelizing each of the point cloud frames in the sequence of point cloud frames; generating a 4D tensor from the voxelized point cloud frames; and processing the 4D tensor to identify features in the point cloud frames.

In some or all examples of the first aspect, the processing can include: for each point in the point cloud frames, finding k nearest neighbors; and determining a semantic label for the point at least partially based on the features of the k nearest neighbors.

In some or all examples of the first aspect, the determining can include: calculating a weight for each of the k nearest neighbors at least partially based on a Euclidian distance between the point and the nearest neighbor.

In some or all examples of the first aspect, during the calculating of the Euclidian distance, a unit of distance can be used to compensate for a unit of time between point cloud frames.

In some or all examples of the first aspect, during the determining, the weights can be used to determine a weighted sum of the features of the nearest neighbors.

In some or all examples of the first aspect, the weighted sum of the features of the nearest neighbors can be used in combination with the features of the point to semantically segment the point.

In accordance with a second aspect of the present disclosure, there is provided a computing system for semantic segmentation of a point cloud frame, the computing system comprising: a processor; a memory storing machine-executable instructions that, when executed by the processor, cause the processor to: receive point cloud frames including a target point cloud frame; for each sequence of a sliding set of sequences of point cloud frames, the sequence including the target point cloud frame, semantically segment each point cloud frame in the sequence of point cloud frames to apply semantic labels to points; and determine a most prevalent semantic label for each point in the target point cloud frame across the sliding set of sequences of point cloud frames.

In some or all examples of the second aspect, the machine-executable instructions, when executed by the processor, can cause the processor to: identify a rare semantic label for at least one of the points in the target point cloud frame across the sliding set of sequences of point cloud frames; and use the rare semantic label in place of the most prevalent semantic label for the at least one point in the target point cloud frame.

In some or all examples of the second aspect, the machine-executable instructions, when executed by the processor, can cause the processor to: perform a single-scan semantic segmentation of the target point cloud frame; and use ensemble learning to combine the single-scan semantic segmentation with the most prevalent labels for each point in the target point cloud frame across the sliding set of sequences of point cloud frames.

In some or all examples of the second aspect, the machine-executable instructions, when executed by the processor, can cause the processor to: perform a single-scan semantic segmentation of the target point cloud frame; and use ensemble learning to combine the single-scan semantic segmentation with the rare semantic labels and the most prevalent labels for each point in the target point cloud frame across the sliding set of sequences of point cloud frames.

In some or all examples of the second aspect, the machine-executable instructions, when executed by the processor, can cause the processor to, during semantic segmentation: voxelize each of the point cloud frames in the sequence of point cloud frames; generate a 4D tensor from the voxelized point cloud frames; and process the 4D tensor to identify features in the point cloud frames.

In some or all examples of the second aspect, the machine-executable instructions, when executed by the processor, can cause the processor to, during the processing: for each point in the point cloud frames, find k nearest neighbors; and determine a semantic label for the point at least partially based on the features of the k nearest neighbors.

In some or all examples of the second aspect, the machine-executable instructions, when executed by the processor, can cause the processor to, during the determining: calculate a weight for each of the k nearest neighbors at least partially based on a Euclidian distance between the point and the nearest neighbor.

In some or all examples of the second aspect, the machine-executable instructions, when executed by the processor, can cause the processor to, during the calculation of the Euclidian distance, use a unit of distance to compensate for a unit of time between point cloud frames.

In some or all examples of the second aspect, the machine-executable instructions, when executed by the processor, can cause the processor to, during the determining, use the weights to determine a weighted sum of the features of the nearest neighbors.

In some or all examples of the second aspect, the weighted sum of the features of the nearest neighbors can be used in combination with the features of the point to semantically segment the point.

In accordance with a third aspect of the present disclosure, there is provided a non-transitory machine-readable medium having tangibly stored thereon executable instructions for execution by one or more processors, wherein the executable instructions, in response to execution by the one or more processors, cause the one or more processors to: In some or all examples of the second aspect, the machine-executable instructions, when executed by the processor, can cause the processor to: identify a rare semantic label for at least one of the points in the target point cloud frame across the sliding set of sequences of point cloud frames; and use the rare semantic label in place of the most prevalent semantic label for the at least one point in the target point cloud frame.

In some or all examples of the third aspect, the machine-executable instructions, when executed by the processor, can cause the processor to: perform a single-scan semantic segmentation of the target point cloud frame; and use ensemble learning to combine the single-scan semantic segmentation with the most prevalent labels for each point in the target point cloud frame across the sliding set of sequences of point cloud frames.

In some or all examples of the third aspect, the machine-executable instructions, when executed by the processor, can cause the processor to: perform a single-scan semantic segmentation of the target point cloud frame; and use ensemble learning to combine the single-scan semantic segmentation with the rare semantic labels and the most prevalent labels for each point in the target point cloud frame across the sliding set of sequences of point cloud frames.

In some or all examples of the third aspect, the machine-executable instructions, when executed by the processor, can cause the processor to, during semantic segmentation: voxelize each of the point cloud frames in the sequence of point cloud frames; generate a 4D tensor from the voxelized point cloud frames; and process the 4D tensor to identify features in the point cloud frames.

In some or all examples of the third aspect, the machine-executable instructions, when executed by the processor, can cause the processor to, during the processing: for each point in the point cloud frames, find k nearest neighbors; and determine a semantic label for the point at least partially based on the features of the k nearest neighbors.

In some or all examples of the third aspect, the machine-executable instructions, when executed by the processor, can cause the processor to, during the determining: calculate a weight for each of the k nearest neighbors at least partially based on a Euclidian distance between the point and the nearest neighbor.

In some or all examples of the third aspect, the machine-executable instructions, when executed by the processor, can cause the processor to, during the calculation of the Euclidian distance, use a unit of distance to compensate for a unit of time between point cloud frames.

In some or all examples of the third aspect, the machine-executable instructions, when executed by the processor, can cause the processor to, during the determining, use the weights to determine a weighted sum of the features of the nearest neighbors.

In some or all examples of the third aspect, the weighted sum of the features of the nearest neighbors can be used in combination with the features of the point to semantically segment the point.

Other aspects and features of the present disclosure will become apparent to those of ordinary skill in the art upon review of the following description of specific implementations of the application in conjunction with the accompanying figures.

BRIEF DESCRIPTION OF THE DRAWINGS

Reference will now be made, by way of example, to the accompanying drawings which show example embodiments of the present application, and in which.

Unless otherwise specifically noted, articles depicted in the drawings are not necessarily drawn to scale.

DETAILED DESCRIPTION OF EXAMPLE EMBODIMENTS

The present disclosure is made with reference to the accompanying drawings, in which embodiments are shown.

However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although such functions are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except wherein indicated otherwise either explicitly or inherently by context.

In various examples, the present disclosure describes a system and method for semantic segmentation of a sequence of point clouds frames to predict semantic labels for objects. Semantic segmentation of a target point cloud frame is performed while taking into consideration the moving status of movable objects from a multi-frame point clouds. This includes the prediction of semantic labels (e.g., road, sidewalk, vegetation, parking, person, cars, trucks), and the moving status of some movable objects (e.g., moving/non-moving cars, moving/non-moving motorcyclists).

Now, a particular embodiment of the disclosure will be described. In a particular embodiment, multi-scan semantic segmentation is employed. The objective of multi-scan semantic segmentation is to segment not only the traditional semantic classes, (road, sidewalk, car, pedestrian, etc.), but also additional moving status for movable object classes (moving/non-moving car, moving/non-moving pedestrians, etc.). In other words, it is desired for the multi-scan model to determine the difference between moving objects points and static objects points by examining the displacement of moving objects points over the frames. This is hardly possible even for a human by only looking at one single frame a time because the corresponding moving and non-moving classes usually share very similar geometric features. One single point cloud frame of a parked car does not look different from a car moving forward. As a result, there is benefit from using more frames instead of one. The additional motion label provides knowledge about dynamics in the environment and offers possibility of speed estimation and trajectory prediction of other entities on the road. The knowledge mentioned above are keys to the route planning tasks of the autonomous car.

Figure 1A:
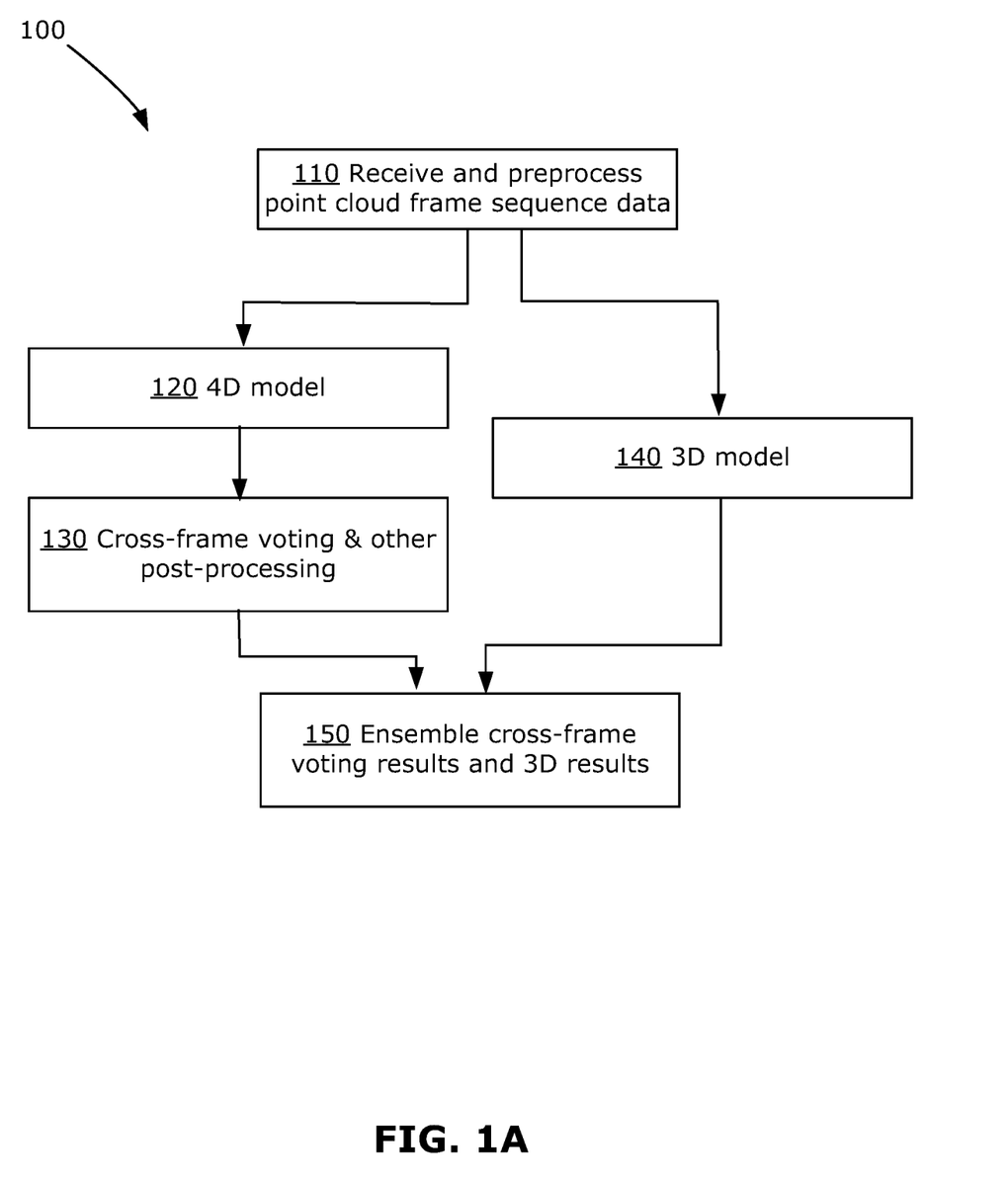
FIGS. 1A to 1D are flow charts showing a general method for semantic segmentation of a point cloud frame in accordance with example embodiments of the present disclosure.

To achieve semantic segmentation and motion segmentation, the pipeline needs the capability of processing multiple consecutive LiDAR scans (i.e., point cloud frames) as input and extracting and analyzing the spatial-temporal features. An input 4D tensor to a network is composed of continuous frames of voxelized point clouds. A four-dimensional encoder-decoder convolutional neural network (CNN) is used as a backbone and employs a specially designed Internal Cross-frame Local Interpolation for 4D Tensor (ICLI-4D) module to help the model learn the temporal features. During training, minority class objects from a multi-scan object library are injected into the continuous scene, in an attempt to address the issue of class imbalance. Furthermore, cross-frame voting (CFV) is employed to reduce uncertainty of multi-scan outputs, whose results are further combined with the state-of-the-art single-scan segmentation result. In summary, our main contributions of FIG. 1A shows a general method 100 carried out by a computing system for semantic segmentation of a target point cloud frame in accordance with an embodiment of the present disclosure. The method 100 commences with the receipt and pre-processing of point cloud frame sequence data (110). The computing system includes a pre-processing module that receives and pre-processes the point cloud frame sequence data containing the target point cloud frame. The point cloud frame sequence data represents a set of points captured with a LIDAR sensor device or another suitable device for capturing point clouds. The points correspond to a set of frames. Each of the points in a single frame are either captured simultaneously or are captured in a sufficiently small period of time so that the points represent the approximate positions of surfaces at a single point in time. Thus, the point cloud frame sequence data represents point cloud frames from a sequence of times. In some embodiments, the temporal separation between the capture of adjacent point cloud frames is one-tenth of a second, but this time period can be varied in other embodiments. Further, it is conceived that the point cloud frames can be separated by unequal time periods, in which case the calculations described herein can be adjusted accordingly. Each frame of the point cloud frame sequence data is projected into a range image r, either by the pre-processing module or is received already projected into range images.

The pre-processing module of the system is configured to pre-process sequences of point cloud frames (five consecutive point cloud frames in the presently described embodiment), to insert objects into the point cloud frames and transfer every point cloud frame of the sequence of point cloud frames into the coordinates of the last point cloud frame of the sequence of point cloud frames (110). In other embodiments, the pre-processing module can be configured to transfer every point cloud frame of the sequence into the coordinates of another point cloud frame in the sequence, or another suitable reference system. The number of consecutive point cloud frames will be discussed further herein.

Figure 1B:
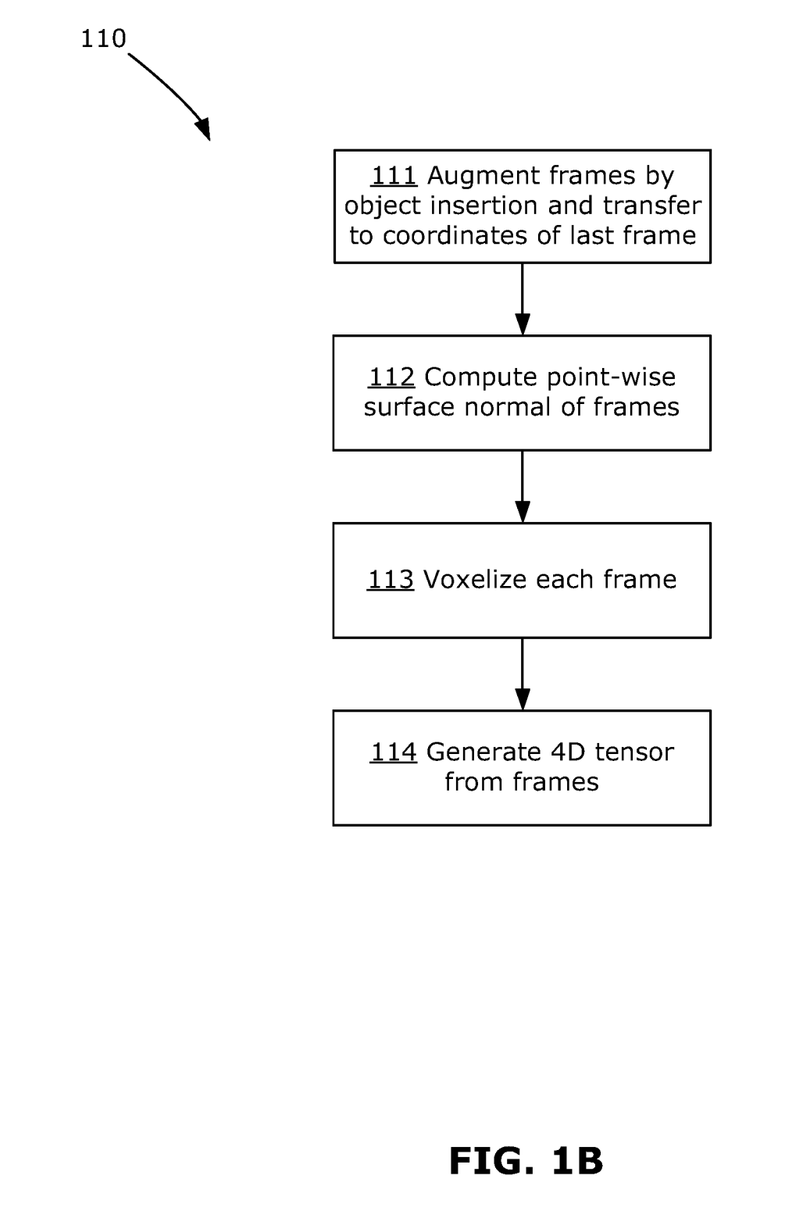

FIG. 1B shows the actions performed by the pre-processing module at 110. The five consecutive point cloud frames are used to generate the input data of the network. First, all these five point cloud frames are augmented by object insertion and transferred into the LiDAR coordinates frame of the last point cloud frame (111). Then, the point-wise surface normal of the five point clouds are computed (112), and the nine point clouds are voxelized separately (113). Finally, a 4D tensor, whose structure is (time, x, y, z), can be generated by stacking these voxelized point clouds together (114). The 4D tensor has four channels, which are the intensity (reflectivity) and the calculated 3D surface normal vector. Note that, the "time" in the 4D tensor is denoted by integer, which is used to eliminate the influence of different LiDAR sampling time on the algorithm.

Referring again to FIG. 1A, the pre-processing module then passes the 4D tensor and point cloud frame sequence data to a 4D autoencoder for cross-frame local interpolation on the 4D tensor to extract rich spatial-temporal features (120). The 4D autoencoder is implemented as a neural network comprising four encoder layers followed by four decoder layers. Each encoder layer performs a convolution and batch normalization operation on an input feature map. Each encoder layer also includes a context aggregation module (CAM) and a Squeeze Re-weight module.

Figure 1C:
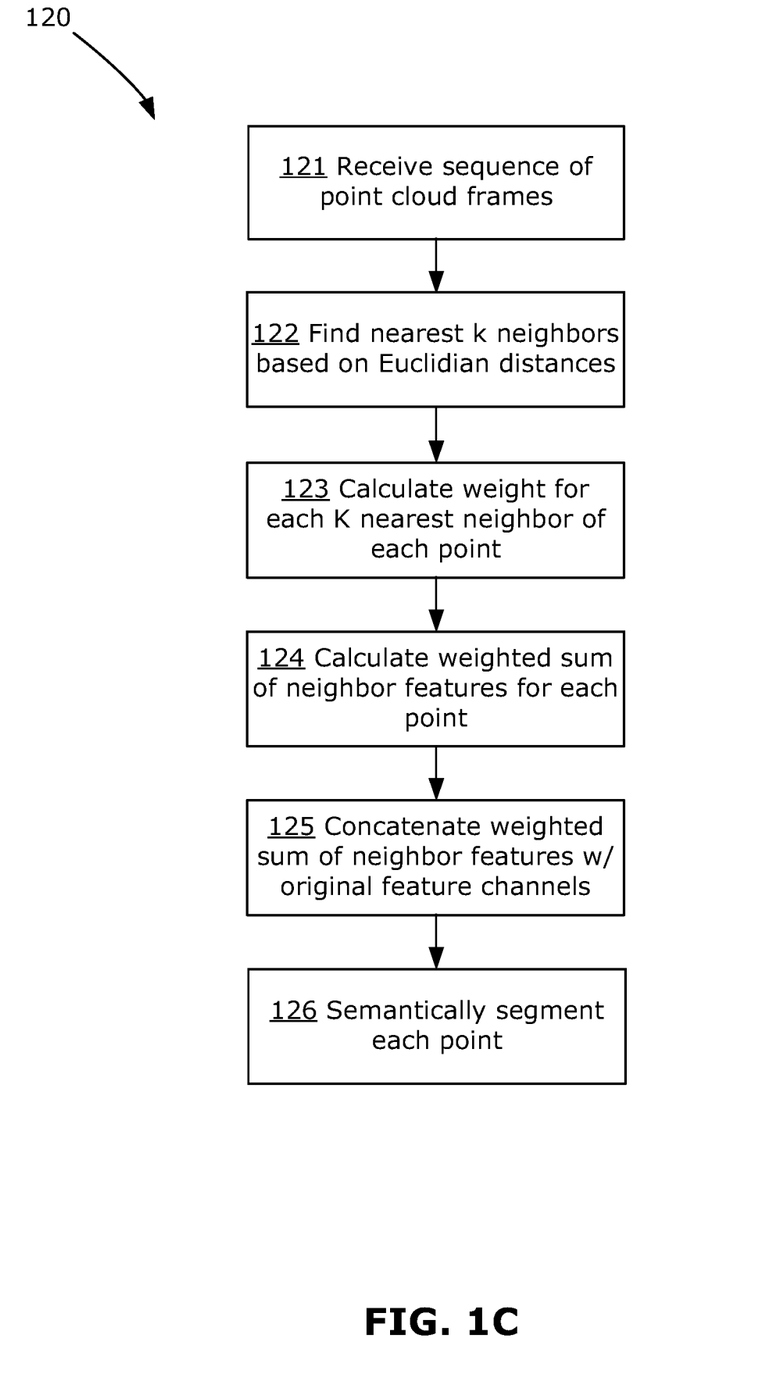
Figure 2:
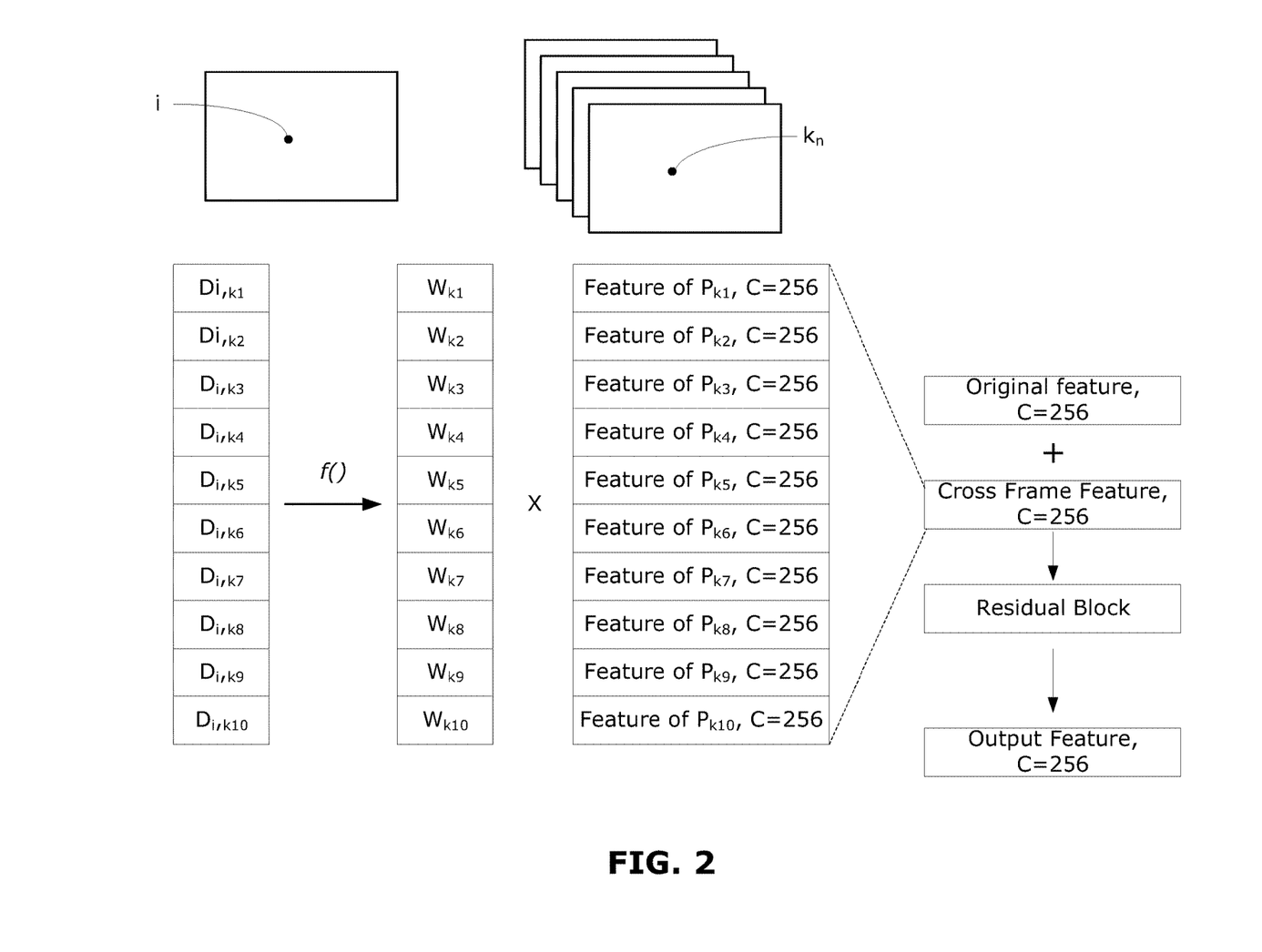
FIG. 2 shows a process of cross-frame local interpolation on a 4D tensor forming part of the method of FIGS. 1A to 1D.

Referring now to FIGS. 1C and 2, the 4D autoencoder also includes an Internal Cross-frame Local Interpolation for 4D Tensor (ICLI-4D) module disposed between the last decoder layer and the first decoder layer. The ICLI-4D module is configured to aggregate local spatial-temporal information from two consecutive point cloud frames in the sequence of point cloud frames. Upon receiving the point cloud frame sequence data in the form of the 4D tensor (121), for each voxel in the 4D tensor, the ICLI-4D module finds the K nearest points internally in the 4D tensor using their computed Euclidean distances (122). The K nearest points and their distances are found by maintaining a ball-tree data structure. The ball-tree data structure is a K×4 matrix, where each row is for a point in the ball. The K nearest points in 4D space are found, so there are K rows. Each row includes four columns for x, y, z coordinates, and for a timestamp corresponding to a time or relative time at which the point was captured.

The Euclidean distances are computed considering all four dimensions; that is along the x, y, and z axis, and time. A distance of one meter is used for temporal distances between each point cloud frame, and these distances are used when determining the k nearest neighbors and the Euclidian distances to each of the k nearest neighbors. The temporal dimension is included because temporal distance provides crucial information to determining a moving label.

For the distance to each k nearest neighbor, $k_j$, a normalized weight is calculated based on the distances to all of the k nearest neighbors (123):

$$w_{k_j} = \frac{1/\min(1, D_{i,k_j}/\alpha)}{\Sigma_{m=1}^{n} 1/\min(1, D_{i,k_m}/\alpha)},$$

where $D_{i,k_m}$ is the distance between the point being examined, i, and a nearest neighbor, $k_m$. The reasonable a and n should be determined by the receptive field and real world dimension of the voxel at the layer where this is applied to since the purpose of this module is to search and extract neighborhood spatial-temporal features across-frames. In the currently described embodiment, the values of n and a are set as 10 and 4 respectively. In fact, the ICLI-4D module can be used behind other encoder or decoder, but due to the increase in the number of voxels, the network will be much heavier. In the autonomous driving context, this specific module has extraordinary effect to extract moving objects when the geometric structure does not align across-frames due to the movement of objects. Then, a weighted sum with the weights and the features of the corresponding k nearest neighbors is calculated (124).

The weighted features of the k nearest neighbors are then concatenated with the original feature channel for each point in the 4D point cloud and fed into a residual block (125). The output of the residual block is the semantic segmentation result of each voxel in 4D tensor (126). Semantic segmentation entails the labelling of each voxel with a label corresponding to a class to which the voxel is deemed to below. Classes can include, for example, road, grass, building, pedestrian, motorcycle, and car. The system includes a single scan neural network which is configured to perform semantic segmentation on each voxel in each point cloud frame to predict semantic labels for each point in each point cloud frame in the sequence. In the autonomous driving context, this specific module has extraordinary effect to extract moving vehicle/person when the geometric structure does not align across-frames due to the movement of objects.

Steps 110 and 120 are repeatedly performed to incorporate new point cloud data as it is collected and received. A new point cloud frame is added and the oldest point cloud frame is dropped from the sequence of five point cloud frames processed at 110 and 120. Each time label results are generated for the sequence of five sliding voxelized point cloud frames, they are stored in memory.

The algorithm performs semantic segmentation for each of the five frames of the voxelized point cloud sequences. Usually, the prediction results for a particular frame are inconsistent across different sequences. More specifically, a voxel may have different predicted semantic labels in different sequences of five frames. For example, wherein the ICLI-4D module has calculated semantic segmentation inference results for point cloud frames 0 to 4, 1 to 5, 2 to 6, 3 to 7, and 4 to 8, the semantic segmentation inference results for frame 4 in the sequence 0 to 4 may differ from the semantic segmentation inference results for point cloud frames 1 to 5, or from 2 to 6, etc. In order to reduce this inconsistency, cross-frame voting method is used. After the cross-frame voting, each voxel has a unique semantic label, and all the points that belong to this voxel will be assigned the same semantic label.

Referring again to FIG. 1A, upon receiving results from the semantic segmentation of five sliding five-frame sequences (e.g., point cloud frames 0 to 4, 1 to 5, 2 to 6, 3 to 7, and 4 to 8) from the ICLI-4D module, a post-processing module implements a cross-frame voting method to process the inference results from the 4D tensors for the five sequences of point cloud frames (e.g., point cloud frames 0 to 4, 1 to 5, 2 to 6, 3 to 7, and 4 to 8) for a target point cloud frame to increase the consistency of predictions (130). The target point cloud frame is the middle frame of the five sequences (that is, frame 4 in the referenced example). For example, for five sequences extending over nine consecutive point frames (e.g., frames 0 to 8), a frame (e.g., frame 4) will be inferred in five consecutive sliding windows by the 4D autoencoder. Hence, the 4D autoencoder generates five slightly different inference results of semantic segmentation on frame 4. The post-processing module gather all five inference results and performs a point-wise majority voting to eliminate some random noise in the inference results.

Figure 1D:
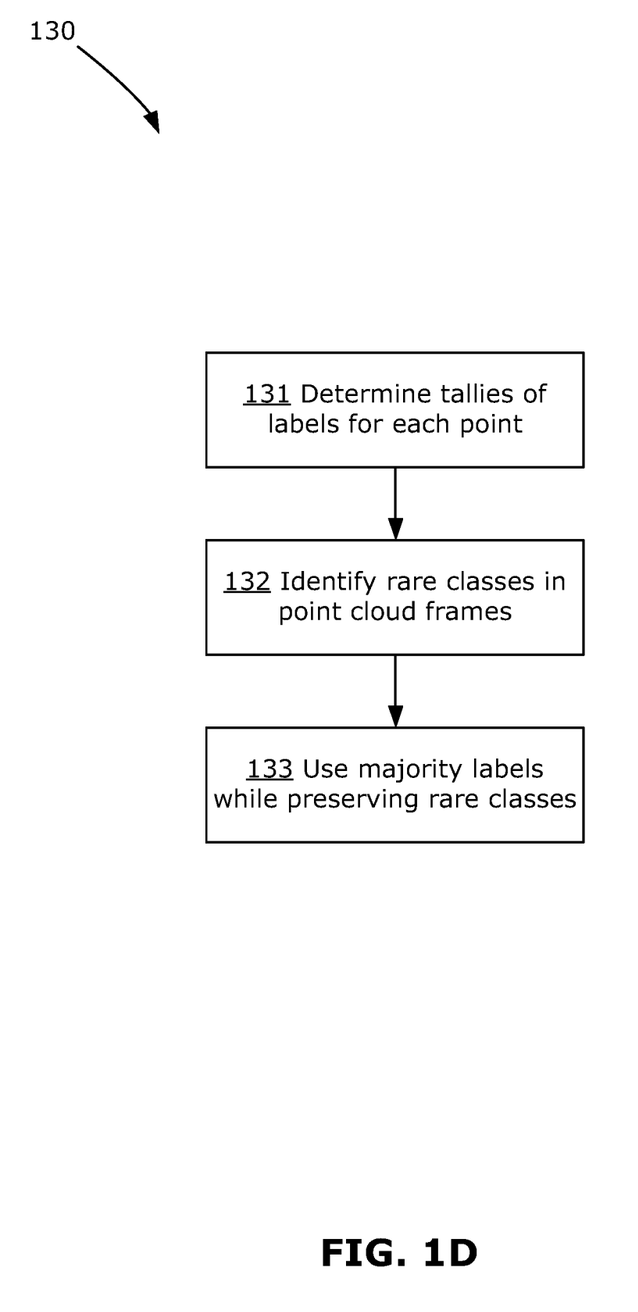
Figure 3:
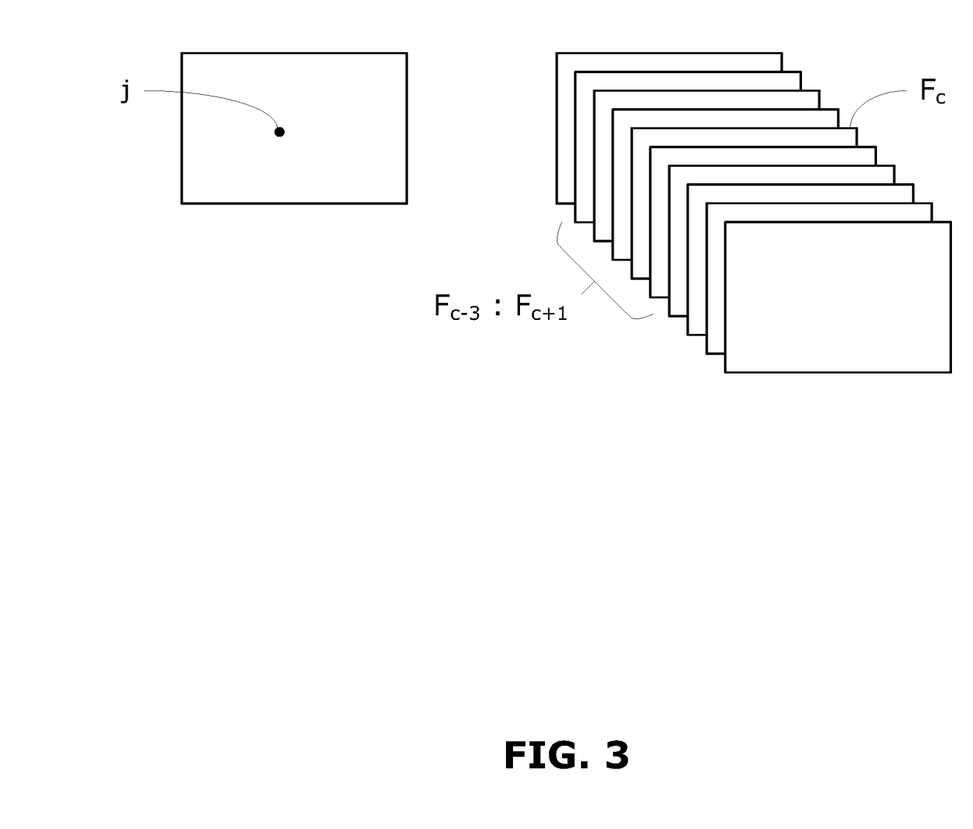
FIG. 3 illustrates cross-sequence voting in accordance with the method illustrated in FIGS. 1A to 1D.

Now with reference to FIGS. 1D and 3, in the five sequence of five frames, the semantic labels are tallied for each point of the target point cloud frame (131). Next, rare classes in the target point cloud frame in the results for the five sequences being analyzed are identified (132). Simply voting by majority will easily ignore some rare classes which may cause the overall mean IoU to decrease. Therefore after each voting round, if any rare classes present in any frame of prediction, the rare class is identified by:

$$\frac{\text{avg(number of labels of the class before voting)}}{\text{number of labels in the voting result}} > 3$$

If the class satisfies the relationship above, it is determined to be a rare class. If any rare classes are present in the inferenced results for the target point cloud frame in any of the five frame sequences, the rare class is assigned as a semantic label for the point, even if the voting results says otherwise.

Some datasets, such as SemanticKITTI, have a more serious class imbalance problem in multi-scan segmentation than that in single-scan segmentation. For some classes like static motorcyclist, static bicyclist and moving motorcyclist, only a few instances may be found throughout the entire datasets. Unlike the validation set in the single-scan scenario that contains all classes, neither training nor validation set is complete.

When the training set does not have certain classes, the model will not be able to learn those classes, and unsurprisingly, result in 0 training and validation mIoU. When the validation set does not have certain classes, the model might be able to learn it from the training set; however, the validation set cannot help determine how well the model can generalize for those classes. To solve the class imbalance problem, two data augmentation methods are developed, which are data redistribution and object injections. Data redistribution ensures that both the training set and the verification set can contain all classes as much as possible by exchanging some frames that contain rare classes between them. The disadvantage of data redistribution is that the training set is slightly polluted by the validation set because moving a few small sequences from validation to training set exposes those similar scenes to the training set, leading to an inflated validation score. In addition, the metrics to evaluate how well the model is performing are lost. Object injection is to detach the rare object instances from their scenes and create new synthetic training data by injecting these object instances into other LiDAR scans. To do so, a multi-scan object library needs to be created by extracting rare class objects from continuous point cloud frames. This library can also be created by generating static objects from moving objects with the Iterative Closest Point (ICP) algorithm, as described in P. J. Besl et al., "Method for registration of 3-d shapes," in Sensor fusion IV: control paradigms and data structures, vol. 1611, International Society for Optics and Photonics, 1992, or generating moving objects from static objects using a fake velocity. During the training, the object sequences in the library will be injected into the continuous point cloud frames dynamically. Mutual generation of moving and static objects increases the diversity of the rare foreground objects, and avoids the data pollution problem in data redistribution.

The majority labels for each point in the target point cloud frame in the sequences of frames being analyzed, while preserving rare classes, is then determined (133).

The above example takes the inference result of the target point cloud frame (i.e., point cloud frame 4) from 5 different sequences (i.e., frames 0 to 4, frames 1 to 5, frames 2 to 6, frames 3 to 7, and frames 4 to 8) and vote for each point. This method can be applied to all frames f>=N and f<M−N in a long sequence with M elements. Taking the inference results for the same frame generated by different sequences and applying a pointwise voting. Voting with different batch predictions of the same frame increases the consistency of predictions. Specifically solving the problem of moving vehicle being inferenced as half moving and half non-moving. This method can be used as a post-processing mechanism after the inference result is generated. For example, frame 4 can get five segmentation results from these five sequences, providing five votes for each voxel. If three votes are car, and two are truck, the vote result is car.

Separately, semantic segmentation is performed on the target point cloud frame (140). This is done using a single rscan neural network. The post-processing module then uses the output features (i.e., the segmentation results/classes/labels) from 120, the label voting from 130, and the semantic labeling results from 140 to perform ensemble learning to select as many points assigned a potential large flat surface class as possible from the voted inference results of the 4D autoencoder and the single scan neural network (150). This is the rule-based ensemble method. If a voxel is segmented as big plane (road, sidewalk, building . . . ) class by 140, the segmentation result from 140 is used. If a voxel is segmented as the small object at 130, then the segmentation result from 130 is used. Experiments show that for some of the static classes, especially the large flat surface classes like road, sidewalk, parking, other ground, building, fence and traffic sign, the segmentation result of single-scan method is better than that of multi-scan method. In order to take advantage of each of the two models, the ensemble learning technique is utilized.

Tests indicate that the single-scan semantic segmentation method usually gives better performance on large flat surface classes than that of the multi-scan method. The ensemble strategy is used to take advantage of each of the two models. The main process of ensemble learning is 1) implementing single-scan and multi-scan semantic segmentation algorithms on the same dataset; 2) getting the point indices of these large flat surface classes, which include road, sidewalk, parking, other ground, building, fence and traffic sign, from prediction of the single-scan method, and defined the set as Cs; 3) getting the point indices of these large flat surface classes from the prediction of multi-scan method, and define the set as Cm; 4) getting the point indices of movable object classes, which include moving car, moving person, moving bicyclist, moving motorcyclist, moving truck, car, truck, other vehicle) from the prediction of the multi-scan method, and define the set as G; 5) $Q=\{x|x \in C_s \cup C_m, x \notin G\}$ is the subset which needs to be replaced by the prediction result of the single-scan method.

The basic logic of this ensemble strategy is to select as many potential large surface classes points as possible from both single-scan and multi-scan methods. If the potential points are not segmented as the moving object by the multi-scan method, the segmentation result of the single-scan method is used. This strategy maximally utilize the advantage of the single-scan segmentation in large surface classes. Meanwhile, it ensures that the multi-scan segmentation results of these moving objects will not be overwritten during the replacement of labels.

Tests using this approach showed a performance improvement of 3.9% over prior art methods using some datasets.

Figure 4:
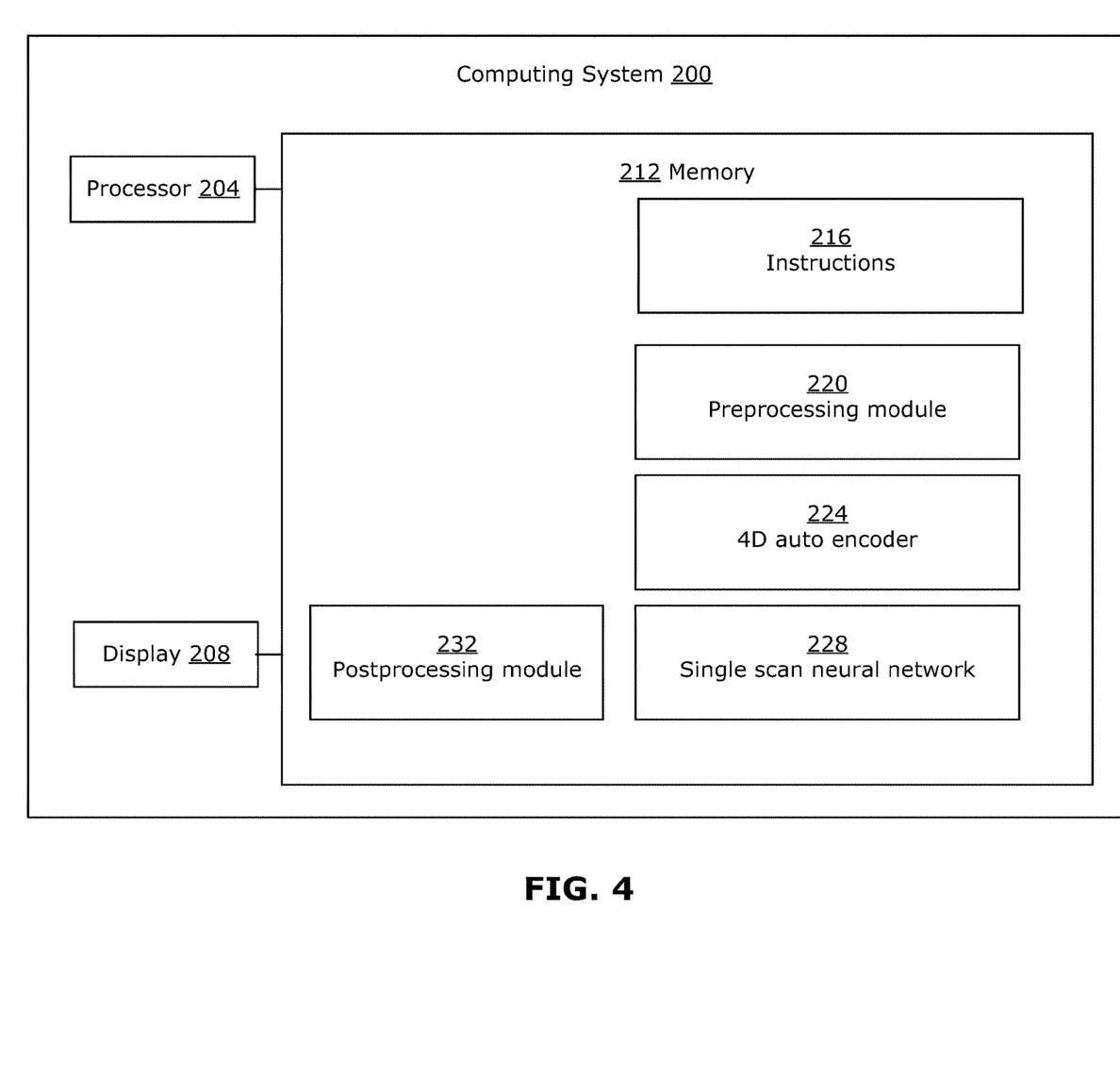
FIG. 4 is a schematic diagram illustrating various physical and logical components of a computing system for semantic segmentation of a point cloud frame in accordance with example embodiments of the present disclosure.

FIG. 4 shows various physical and logical components of an exemplary computing system 200 for training and using the audio-visual transformation network 20 for generating visual images from audio data in accordance with an embodiment of the present disclosure. Although an example embodiment of the computing system 200 is shown and discussed below, other embodiments may be used to implement examples disclosed herein, which may include components different from those shown. Although FIG. 4 shows a single instance of each component of the computing system 200, there may be multiple instances of each component shown. The example computing system 200 may be part of, or connected to, a simultaneous localization and mapping (SLAM) system, such as for autonomous vehicles.

The computing system 200 includes one or more processors 204, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 204 may collectively be referred to as a processor 204. The computing system 200 may include a display 208 for outputting data and/or information in some applications, but may not in some other applications.

The computing system 200 includes one or more memories 212 (collectively referred to as "memory 212"), which may include a volatile or non-volatile memory (e.g., a flash memory, a random access memory (RAM), and/or a read-only memory (ROM)). The non-transitory memory 212 may store machine-executable instructions for execution by the processor 204. A set of machine-executable instructions 216 defining the pre-processing module 220, the 4D auto encoder 224, the single scan neural network 228, and the post-processing module 232 are shown stored in the memory 212, which may be executed by the processor 204 to perform the steps of the methods described herein. The memory 212 may include other machine-executable instructions for execution by the processor 204, such as machine-executable instructions for implementing an operating system and other applications or functions.

In some examples, the computing system 200 may also include one or more electronic storage units (not shown), such as a solid state drive, a hard disk drive, a magnetic disk drive and/or an optical disk drive. In some examples, one or more datasets and/or modules may be provided by an external memory (e.g., an external drive in wired or wireless communication with the computing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 212 to implement data storage, retrieval, and caching functions of the computing system 200.

The components of the computing system 200 may communicate with each other via a bus, for example. In some embodiments, the computing system 200 is a distributed computing system and may include multiple computing devices in communication with each other over a network, as well as optionally one or more additional components. The various operations described herein may be performed by different computing devices of a distributed system in some embodiments. In some embodiments, the computing system 200 is a virtual machine provided by a cloud computing platform.

Although the components for semantic segmentation of a point cloud frame are shown as part of the computing system 200, it will be understood that separate computing devices can be used for training and using the audio-visual transformation network 20 for generating visual images from audio data.

The steps (also referred to as operations) in the flowcharts and drawings described herein are for purposes of example only. There may be many variations to these steps/operations without departing from the teachings of the present disclosure. For instance, the steps may be performed in a differing order, or steps may be added, deleted, or modified, as appropriate.

In other embodiments, the same approach described herein can be employed for other modalities.

Through the descriptions of the preceding embodiments, the present invention may be implemented by using hardware only, or by using software and a necessary universal hardware platform, or by a combination of hardware and software. The coding of software for carrying out the above-described methods described is within the scope of a person of ordinary skill in the art having regard to the present disclosure. Based on such understandings, the technical solution of the present invention may be embodied in the form of a software product. The software product may be stored in a non-volatile or non-transitory storage medium, which can be an optical storage medium, flash drive or hard disk. The software product includes a number of instructions that enable a computing device (personal computer, server, or network device) to execute the methods provided in the embodiments of the present disclosure.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present invention and its advantages have been described in detail, it should be understood that various changes, substitutions and alterations can be made herein without departing from the invention as defined by the appended claims.

The present invention may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A computer-implemented method for semantic segmentation of a point cloud frame, comprising:
  receiving point cloud frames including a target point cloud frame;
  for each sequence of a sliding set of sequences of point cloud frames, the sequence including the target point cloud frame, semantically segmenting each point cloud frame in the sequence of point cloud frames to apply semantic labels to points; and determining a most prevalent semantic label for each point in the target point cloud frame across the sliding set of sequences of point cloud frames.

2. The computer-implemented method of claim 1, further comprising:

identifying a rare semantic label for at least one of the points in the target point cloud frame across the sliding set of sequences of point cloud frames; and using the rare semantic label in place of the most prevalent semantic label for the at least one point in the target point cloud frame.

3. The computer-implemented method of claim 1, further comprising:

performing a single-scan semantic segmentation of the target point cloud frame; and using ensemble learning to combine the single-scan semantic segmentation with the most prevalent labels for each point in the target point cloud frame across the sliding set of sequences of point cloud frames.

4. The computer-implemented method of claim 2, further comprising:

performing a single-scan semantic segmentation of the target point cloud frame; and using ensemble learning to combine the single-scan semantic segmentation with the rare semantic labels and the most prevalent labels for each point in the target point cloud frame across the sliding set of sequences of point cloud frames.

5. The computer-implemented method of claim 1, wherein the semantically segmenting includes:

voxelizing each of the point cloud frames in the sequence of point cloud frames;

generating a 4D tensor from the voxelized point cloud frames; and processing the 4D tensor to identify features in the point cloud frames.

6. The computer-implemented method of claim 5, wherein the processing includes:

for each point in the point cloud frames, finding k nearest neighbors; and determining a semantic label for the point at least partially based on the features of the k nearest neighbors.

7. The computer-implemented method of claim 6, wherein the determining includes:

calculating a weight for each of the k nearest neighbors at least partially based on a Euclidian distance between the point and the nearest neighbor.

8. The computer-implemented method of claim 7, wherein, during the calculating of the Euclidian distance, a unit of distance is used to compensate for a unit of time between point cloud frames.

9. The computer-implemented method of claim 8, wherein, during the determining, the weights are used to determine a weighted sum of the features of the nearest neighbors.

10. The computer-implemented method of claim 9, wherein the weighted sum of the features of the nearest neighbors is used in combination with the features of the point to semantically segment the point.

11. A computing system for semantic segmentation of a point cloud frame, the computing system comprising:

a processor;

a memory storing machine-executable instructions that, when executed by the processor, cause the processor to:

receive point cloud frames including a target point cloud frame;

for each sequence of a sliding set of sequences of point cloud frames, the sequence including the target point cloud frame, semantically segment each point cloud frame in the sequence of point cloud frames to apply semantic labels to points; and determine a most prevalent semantic label for each point in the target point cloud frame across the sliding set of sequences of point cloud frames.

12. The computing system of claim 11, wherein the machine-executable instructions, when executed by the processor, cause the processor to:

identify a rare semantic label for at least one of the points in the target point cloud frame across the sliding set of sequences of point cloud frames; and use the rare semantic label in place of the most prevalent semantic label for the at least one point in the target point cloud frame.

13. The computing system of claim 11, wherein the machine-executable instructions, when executed by the processor, cause the processor to:

perform a single-scan semantic segmentation of the target point cloud frame; and use ensemble learning to combine the single-scan semantic segmentation with the most prevalent labels for each point in the target point cloud frame across the sliding set of sequences of point cloud frames.

14. The computing system of claim 12, wherein the machine-executable instructions, when executed by the processor, cause the processor to:

perform a single-scan semantic segmentation of the target point cloud frame; and use ensemble learning to combine the single-scan semantic segmentation with the rare semantic labels and the most prevalent labels for each point in the target point cloud frame across the sliding set of sequences of point cloud frames.

15. The computing system of claim 11, wherein the machine-executable instructions, when executed by the processor, cause the processor to, during semantic segmentation:

voxelize each of the point cloud frames in the sequence of point cloud frames;

generate a 4D tensor from the voxelized point cloud frames; and process the 4D tensor to identify features in the point cloud frames.

16. The computing system of claim 15, wherein the machine-executable instructions, when executed by the processor, cause the processor to, during the processing:

for each point in the point cloud frames, find k nearest neighbors; and determine a semantic label for the point at least partially based on the features of the k nearest neighbors.

17. The computing system of claim 16, wherein the machine-executable instructions, when executed by the processor, cause the processor to, during the determining:

calculate a weight for each of the k nearest neighbors at least partially based on a Euclidian distance between the point and the nearest neighbor.

18. The computing system of claim 17, wherein the machine-executable instructions, when executed by the processor, cause the processor to, during the calculation of the Euclidian distance, use a unit of distance to compensate for a unit of time between point cloud frames.

19. The computing system of claim 18, wherein the machine-executable instructions, when executed by the processor, cause the processor to, during the determining, use the weights to determine a weighted sum of the features of the nearest neighbors.

20. The computing system of claim 19, wherein the weighted sum of the features of the nearest neighbors is used in combination with the features of the point to semantically segment the point.

* * * * *